UNITED STATES PATENT OFFICE.

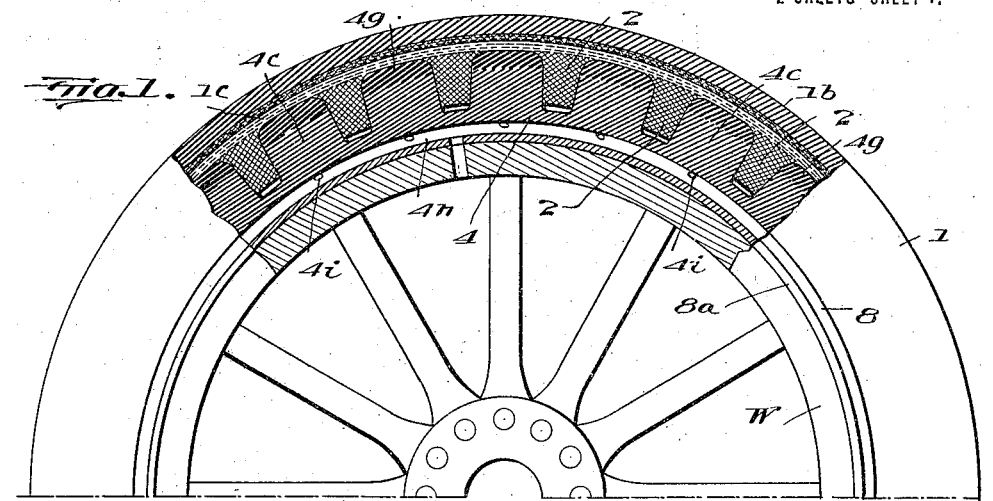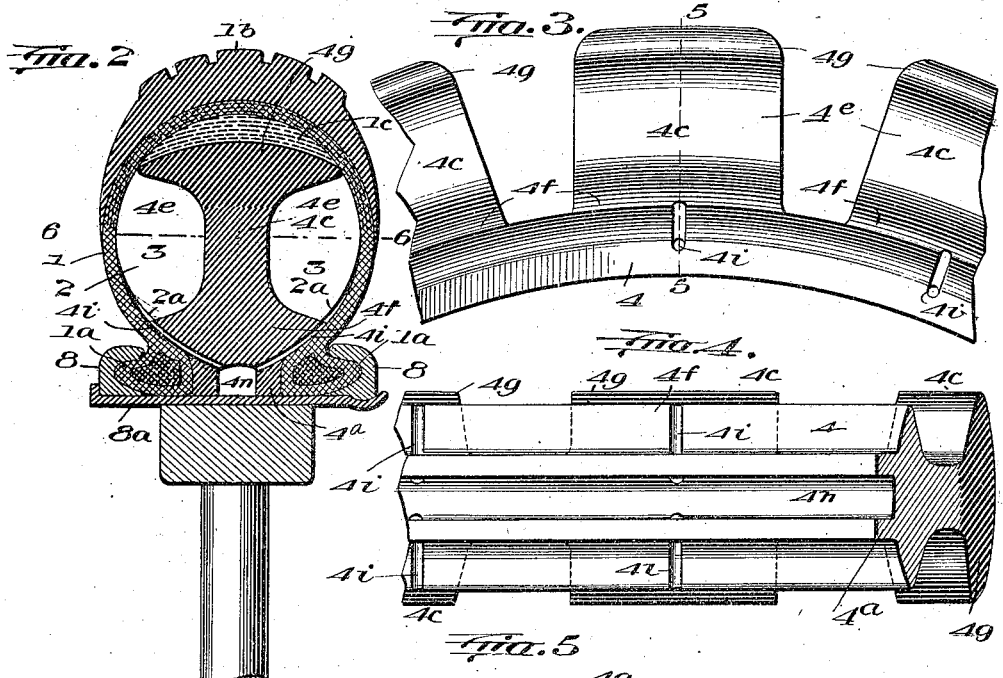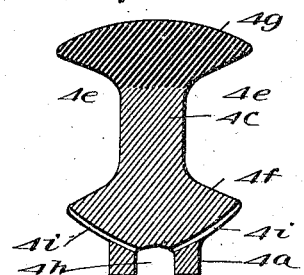

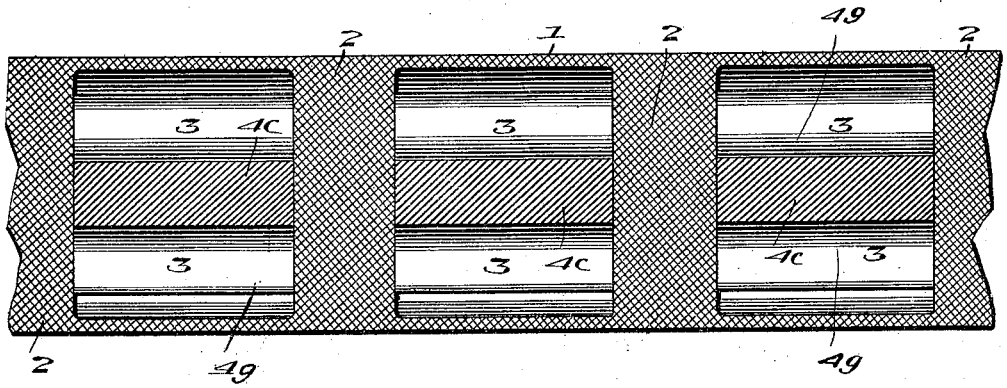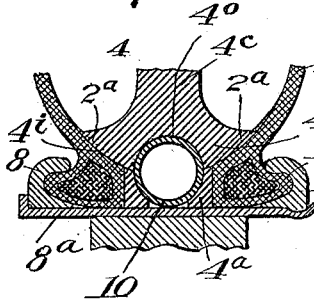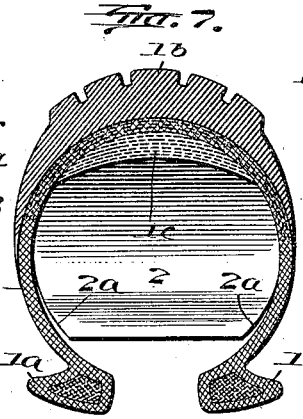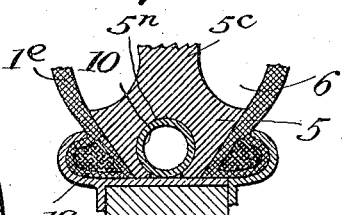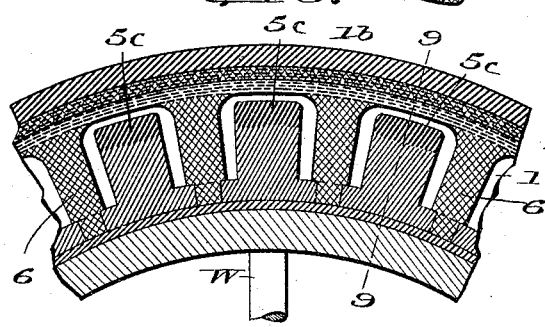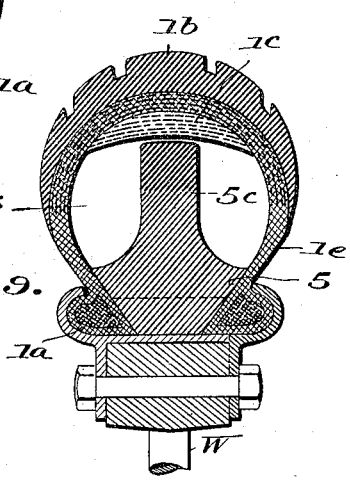

THEODORE A. SPRAGUE, OF PITTSBURGH, PENNSYLVANIA.

CUSHION-TIRE.

1,299,051. Specification of Letters Patent. Patented Apr. 1, 1919.

Application filed December 16, 1916. Serial No. 137,389.

*To all whom it may concern:*

Be it known that I, THEODORE A. SPRAGUE, a citizen of the United States, residing at Pittsburgh, in the county of Allegheny and State of Pennsylvania, have invented certain new and useful Improvements in Cushion-Tires; and I hereby declare that the following is a full, clear, and exact description thereof, reference being had to the accompanying drawings, which form part of this specification.

This invention is an improvement in cushion tires for vehicles designed to be used in place of the so called pneumatic tires, and the object of the present invention is to provide a tire which will be resilient, capable of withstanding heavy service, and while cushioning the vehicle against jarring will also be capable of withstanding the lateral or side thrusts to which cushion tires are subjected as well as the vertical thrusts and pressure caused by the load; and which will not " creep " on the wheel.

The invention consists in the novel construction of the tire or tire filler which is hereinafter described with reference to the accompanying drawings, which illustrate one practical embodiment of the invention, and also a modification thereof. The essential features of construction and combination of parts for which protection is desired are summarized in the claims appended to the description.

In said drawings:

Figure 1 is a partial side elevation and part sectional view of one of my new tires applied to a wheel.

Fig. 2 is an enlarged transverse section of the tire.

Fig. 3 is an enlarged detail view of the filler member detached.

Fig. 4 is a bottom plan view of Fig. 3.

Fig. 5 is a section on line 5—5 Fig. 3.

Fig. 6 is an enlarged section looking upward on the line 6—6 Fig. 2.

Fig. 7 is an enlarged section of the casing detached.

Fig. 8 is a detail sectional view of a modification of the tire.

Fig. 9 is an enlarged section on line 9—9 Fig. 8.

Fig. 10 is a detail view of a tire similar to that shown in Figs. 1 to 7 with an air tube for locking the filler and casing to the wheel rim clamps.

Fig. 11 is a sectional view of a tire similar to that shown in Figs. 8 and 9 with an air tube for locking the filler and casing to the wheel rim clamps.

As shown in the drawings the tire comprises a casing member 1 and a filler member 4. The casing member 1 is preferably shaped to surround the rim of the wheel W and is provided with portions $1^a$ adapted to engage clamps 8 on the rim $8^a$ of the wheel W in the usual manner.

The casing 1 is approximately cylindric in cross section but has an annular slit or opening between the portions $1^a$; and it is preferably provided with an exterior thickened tread portion $1^b$; and may be provided interiorly opposite the tread portion with a reinforced portion $1^c$ as shown.

The casing may resemble in general external appearance an ordinary tire casing, but is provided interiorly with transverse partitions 2 which are preferably equi-distant and slightly tapered, as indicated in Fig. 1, on radial lines of the wheel. These partitions are preferably molded with the casing, or securely united thereto by vulcanization. Preferably the inner edges of each partition 2 are slightly separated from the casing 1, as indicated at $2^a$ in Fig. 7, so as to permit the locking members $1^a$ of the casing to be spread apart to permit the filler member to be more readily inserted in the casing.

The filler member preferably comprises an annular portion 4, from the outer surface of which projects a circumferential series of filler members $4^c$, each filler member being adapted to fit between two adjacent partitions 2 of the casing; and each partition 2 entering between two adjacent filler members $4^c$, as shown in Fig. 1. The filler members $4^c$ are preferably concaved or recessed on their sides, as indicated at $4^e$, and have enlarged bases $4^f$ and enlarged tops $4^g$, when viewed transversely of the tire, see Figs. 2 and 5.

The enlarged outer portions $4^g$ of the filler members $4^c$ are adapted to fit beneath or against the portion $1^c$ of the casing while the bases $4^f$ of the filler members are adapted to overlie the inner portions of the locking members $1^a$ of the casing, when the same is applied to the rim as shown in Fig. 2, and securely hold such locking members to the wheel.

The filler has a base flange $4^a$ adapted to fit between the locking members 1ª as indicated in Fig. 2 and separate them sufficiently to cause them to securely and positively engage with the clamps 8 of the wheel; as indicated in Fig. 2. Preferably this flange 4ª is provided with an inner circumferential groove 4ʰ, which not only increases the resilience of the cushion member but also enables same to be compressed more readily when engaging the casing with the clamps 8. The peculiar formation of the filler and the engagement thereof with the casing will prevent creeping of the tire on the wheel.

If desired the filler member may be provided with air ducts 4ⁱ which may extend into and connect with the groove 4ʰ as indicated in Figs. 2 to 5, so that any air trapped in the chambers 3 (formed between the sides of the filler member 4ᶜ and the sides of the casing and between adjacent partitions 2, see Figs. 2 and 6,) can escape from any point where the casing is compressed through the ducts 4ⁱ and channel 4ʰ to other chambers where the tire is not under compression.

The filler is preferably made out of rubber or like elastic material, and preferably the outer part 4ᵍ of the filler is made of more elastic rubber than the remainder thereof, as indicated in Figs. 1 and 5.

Preferably the casing and filler are made separately; then when it is desired to connect them the locking members 1ª of the casing are spread apart sufficiently to permit the filler to be inserted in the casing, a filler member 4ᶜ being entered between each pair of partitions 2, as indicated in Fig. 1, until the parts are properly assembled; then the complete tire may be attached to the rim of the wheel by means of usual clamps as in Figs. 1 and 2. In some cases if desired the casing and filler may be united by vulcanizing after assembling them together.

It will be seen that the casing and filler form a cellular cushion tire that is braced against both lateral thrust and vertical compression by the partitions 2 and members 4ᶜ. The filler members 4ᶜ and projections 2 form a practically continuous central bearing or support all around the wheel and the greater the pressure on the tire at any point the more tightly will the tire be locked to the wheel.

The chambers 3 provide sufficient cellular space to insure the desired resiliency of the tire; and it will withstand great pressure and severe service without being "killed". Preferably the partitions 2 are so formed that they are not subjected to any vertical or radial pressure until after the filler members 4ᶜ have been partially compressed; so that the filler members 4ᶜ carry the major portion of the load but are reinforced when necessary by the radial compression of the partitions 2.

In the modification shown in Figs. 8 and 9 the casing member may be constructed substantially as in Fig. 1 but instead of having an angular projection on the base of the filler as in Figs. 2 to 4, the base of the filler is made tapered as shown at 5; and in place of the filler members 4ᶜ, filler members 5ᶜ are employed; and the transverse partitions instead of being short, as in Fig. 2, may be made longer than the members 5ᶜ and the inner ends of such partitions may be engaged between the filler members 5ᶜ as indicated in Fig. 8. The preferred construction is that shown in Figs. 1 to 5 as above described.

In the modification shown in Fig. 10 the filler 4 has an annular channel 4ᵒ in it at the junction of the locking members 4ᶠ and flange 4ª in which channel is placed a small pneumatic tube 10, which can be provided with any suitable inflating valve of the usual type (not shown), and after the filler and casing are applied to the rim said tube is inflated to forcibly spread the base of the filler, and the locking members 1ª of the casing apart, and hold such locking members positively engaged with the rim clamp members 8, thus effectually preventing disengagement of the locking members 1ª from the rim clamps 8 so long as the tube 10 is inflated; and also effectively preventing the possibility of the filler and casing disengaging, or "jumping" off, the rim. This pneumatic tube not only spreads the filler member base and holds the locking members in engagement as described, but also tends to hold the filler member itself against the rim.

In the modification shown in Fig. 11 the filler member 5ᶜ is similar to that shown in Fig. 9 but provided with an annular channel 5ⁿ in its base, in which channel is placed a pneumatic tube 10, similar to that above described, for the purpose and with the same effect as above described in relation to the tube 10 shown in Fig. 10.

What I claim is:

1. In a tire, a casing comprising a hollow cylindric body, and a series of transverse radially disposed partitions within the casing, the edges of the said partitions being partially separated from the casing.

2. In a tire, a casing comprising a hollow cylindric body having an inner annular slit, and a series of transverse radially disposed partitions within the casing, the edges of the said partitions being partially separated from the casing adjacent the slit.

3. In a tire, a filler comprising a series of equi-distant filler members recessed in their sides and equally spaced apart, said filler members having enlarged bases and enlarged outer ends.

4. In a tire, a filler comprising an annular member, and a series of filler members attached to and projecting from said annular member, said filler members being recessed in their sides and equally spaced apart, said filler members having enlarged bases and enlarged outer ends.

5. In a tire, a filler comprising an annular member having an annular groove, a series of equi-distant filler members projecting from said annular member, said filler members being recessed in their sides and equally spaced apart.

6. In a tire, a filler comprising an annular member, and a series of equi-distant filler members attached to and projecting from said annular member, said filler members being recessed in their sides and equally spaced apart, said filler members having enlarged bases and enlarged outer heads, said annular member having an annular groove, and air ducts in the base of the annular member communicating with said groove.

7. A tire comprising a casing having a series of inwardly projecting transverse partitions, and a filler having an annular groove and a series of outwardly projecting filler members adapted to be engaged with the casing so that the filler members and partitions alternate, said filler members being recessed on their sides so as to leave air spaces between said partitions.

8. A tire comprising a casing having a series of inwardly projecting transverse partitions, and a filler having an annular groove and a series of outwardly projecting filler members adapted to be engaged with the casing so that the filler members and partitions alternate, said filler members having enlarged heads and bases.

9. A tire comprising a casing having a series of inwardly projecting partitions spaced apart to accommodate filler members, and a series of outwardly projecting filler members adapted to be engaged with the casing and spaced apart to accommodate the partitions, said filler members and partitions alternating in the central part of the tire, and said filler members being recessed on their outer sides to form air spaces between adjacent partitions.

10. In a tire, a filler comprising an annular member, and a series of equi-distant filler members projecting from said annular member and having enlarged bases and enlarged outer ends.

In testimony that I claim the foregoing as my own, I affix my signature.

THEODORE A. SPRAGUE.

Copies of this patent may be obtained for five cents each, by addressing the "Commissioner of Patents, Washington, D. C."